(12) United States Patent
Samie et al.

(10) Patent No.: US 8,622,040 B2
(45) Date of Patent: Jan. 7, 2014

(54) COMPACT TRANSMISSION FLUID HEATER

(75) Inventors: Farzad Samie, Franklin, MI (US);
James L Lanzon, Fenton, MI (US);
Andrew L. Bartos, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/424,438

(22) Filed: Mar. 20, 2012

(65) Prior Publication Data
US 2013/0247864 A1  Sep. 26, 2013

(51) Int. Cl.
*F02M 5/00*  (2006.01)

(52) U.S. Cl.
USPC ............. 123/142.5 R; 123/196 AB; 475/161; 165/96; 60/320

(58) Field of Classification Search
USPC ....... 123/196 AB, 142.5 R; 475/161; 165/96, 165/276; 60/320
See application file for complete search history.

(56) References Cited

U.S. PATENT DOCUMENTS

| | | | | |
|---|---|---|---|---|
| 5,062,474 A | * | 11/1991 | Joshi | 165/109.1 |
| 5,505,164 A | * | 4/1996 | Hollis | 123/41.1 |
| 5,551,384 A | * | 9/1996 | Hollis | 123/142.5 R |
| 6,151,891 A | * | 11/2000 | Bennett | 60/298 |
| 6,217,758 B1 | * | 4/2001 | Lee | 210/167.06 |
| 7,077,776 B2 | * | 7/2006 | Sorab et al. | 475/161 |
| 7,458,414 B2 | * | 12/2008 | Simon | 165/41 |
| 7,637,349 B2 | * | 12/2009 | Harada | 181/265 |
| 8,162,797 B2 | * | 4/2012 | Pursifull | 477/98 |
| 8,413,434 B2 | * | 4/2013 | Prior et al. | 60/320 |
| 2008/0073065 A1 | * | 3/2008 | Samie et al. | 165/96 |
| 2010/0243228 A1 | * | 9/2010 | Price | 165/185 |
| 2012/0198841 A1 | * | 8/2012 | Sloss | 60/605.1 |

FOREIGN PATENT DOCUMENTS

DE   102008028442 A1 * 12/2009 ............. F01M 11/00

* cited by examiner

*Primary Examiner* — Noah Kamen
*Assistant Examiner* — Grant Moubry

(57) ABSTRACT

A transmission fluid heater for a motor vehicle includes a fluid pan mounted on the transmission for storing a supply of transmission fluid. The fluid pan has an inner chamber storing the transmission fluid, and an outer chamber surrounding the inner chamber. An inlet to the outer chamber communicates with a source of engine exhaust gas and an outlet from the outer chamber exhausts the exhaust gas. An inlet valve opens and shuts the communication of engine exhaust gas to the inlet. A plurality of heat exchanger fins enhancing the transfer of heat from the engine exhaust gas within the outer chamber to the transmission fluid is stored within the inner chamber.

18 Claims, 2 Drawing Sheets

COMPACT TRANSMISSION FLUID HEATER

FIELD OF THE INVENTION

The present invention relates to improving transmission performance by heating the transmission fluid and more particularly provides a compact fluid pan heat exchanger using waste heat from the engine exhaust.

BACKGROUND OF THE INVENTION

It is known that the efficiency of motor vehicle automatic transmissions is affected by the viscosity of the automatic transmission fluid. It is also known that transmission spin losses and vehicle fuel economy can be improved by heating of the automatic transmission fluid during engine warm-up and when operating in environments of extreme cold.

The prior art has proposed various add-on auxiliary devices for heating the transmission fluid to the desired temperature at which transmission spin losses are minimized and improved fuel economy is obtained.

It would be desirable to provide a new and improved apparatus for economically achieving the heating of the transmission fluid, in particular a device that would package well in the available space, be of economical manufacture, and take advantage of available waste heat emanating from the vehicle engine.

SUMMARY OF THE INVENTION

A transmission fluid heater for a motor vehicle includes a fluid pan mounted on the transmission for storing a supply of transmission fluid. The fluid pan has an inner chamber storing the transmission fluid, and an outer chamber surrounding the inner chamber. An inlet to the outer chamber communicates with a source of engine exhaust gas and an outlet from the outer chamber exhausts the exhaust gas. An inlet valve opens and shuts the communication of engine exhaust gas to the inlet. A plurality of heat exchanger fins enhances the transfer of heat from the engine exhaust gas within the outer chamber to the transmission fluid is stored within the inner chamber.

The following description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
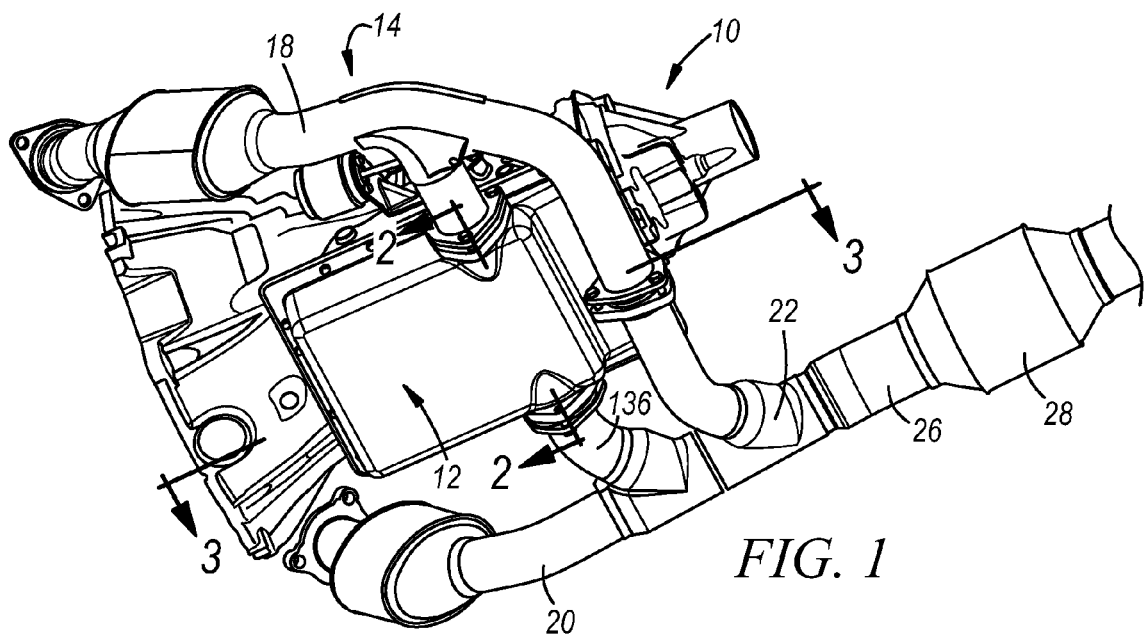
FIG. 1 is a perspective view showing the underside of a motor vehicle transmission including a fluid pan assembly and exhaust pipes carrying waste heat away from the vehicle engine.

FIG. 1 shows the underside of a vehicle transmission and exhaust system. A transmission 10 has a fluid pan assembly 12 bolted on the underside thereof for storing a volume of transmission fluid ready for circulation through the transmission 10. A vehicle exhaust system 14 includes a left bank exhaust pipe 18 and a right bank exhaust pipe 20. The left bank exhaust pipe 18 crosses over beneath the transmission 10 and joins with the right bank exhaust pipe 20 at an exhaust pipe juncture 22. A tailpipe assembly 26 is connected to the exhaust pipe juncture 22 for carrying the engine exhaust gases through an aftertreatment device 28 and then out the rear of the vehicle.

Figure 2:
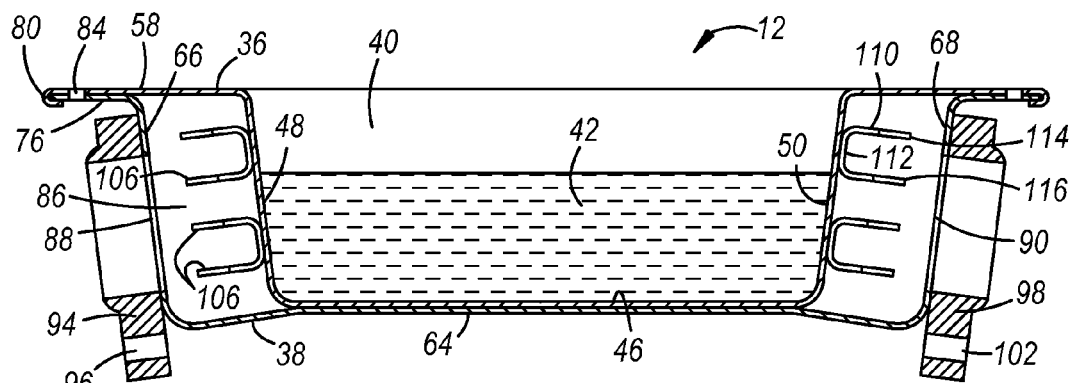
FIG. 2 is a section view taken through the fluid pan assembly in the direction of arrows 2-2 of FIG. 1.
Figure 3:
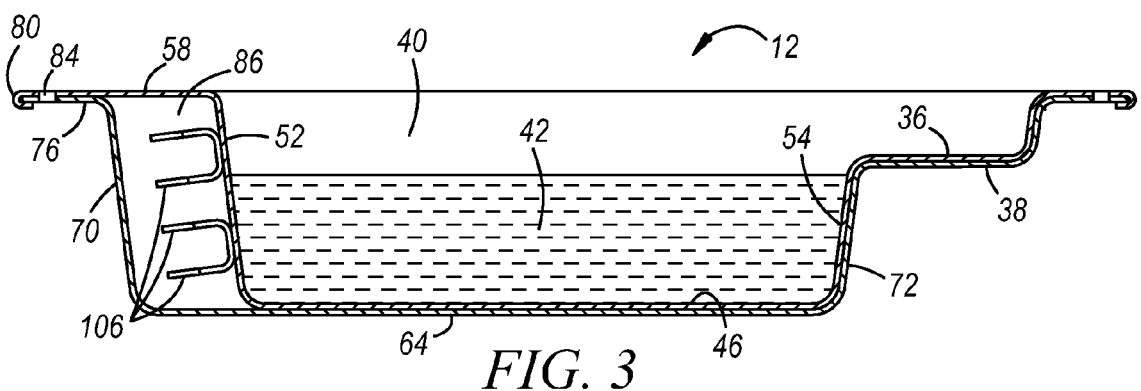
FIG. 3 is a section view taken in the direction of arrows 3-3 of FIG. 1.
Figure 4:
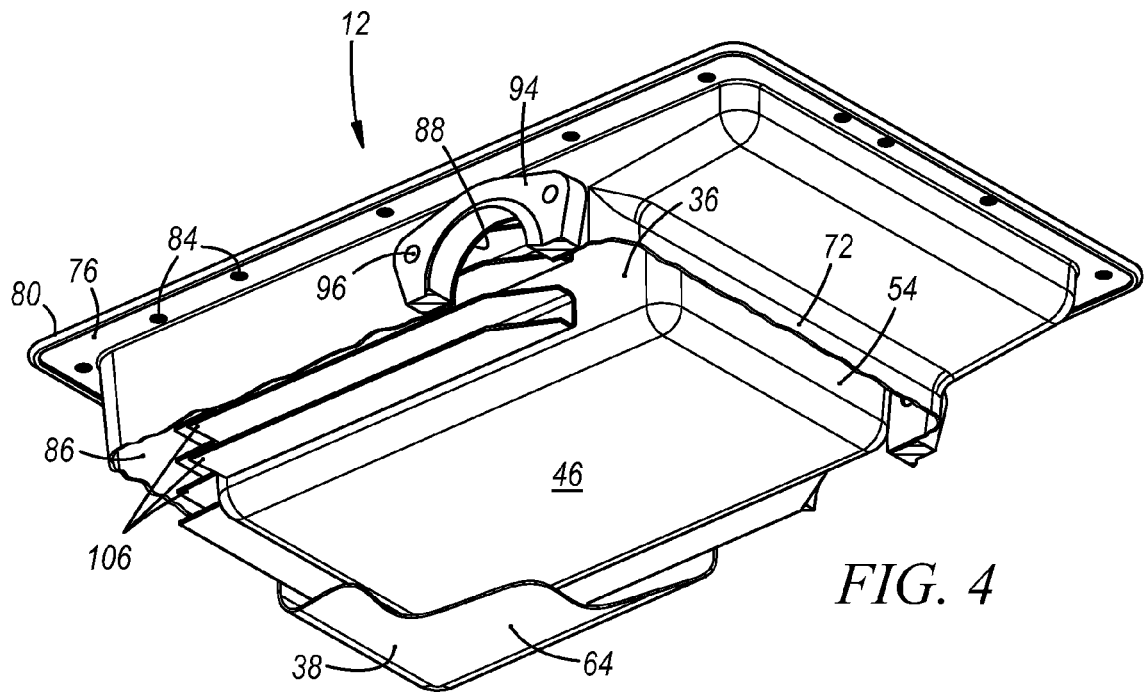
FIG. 4 is a perspective view of the fluid pan assembly, having parts broken away and in section.

Referring to FIGS. 2, 3, and 4, it is seen that the fluid pan assembly 12 includes an inner housing 36 and an outer housing 38. The inner housing 36 defines an inner chamber 40 which stores a supply of transmission fluid 42. A transmission fluid pump, not shown, will pump transmission fluid 42 from the inner chamber 40 and circulate transmission fluid 42 through the transmission 10.

The inner housing 36 and the outer housing 38 are each a metal stamping. In particular, the inner housing 36 has a bottom wall 46, sidewalls 48 and 50, a front end wall 52, and a rear end wall 54. The sidewalls 48 and 50, as well as the front end wall 52 and rear end wall 54, merge into a peripheral flange 58. The outer housing 38 has a bottom wall 64, sidewalls 66 and 68, a front end wall 70, and a rear end wall 72. The sidewalls 66 and 68, the front end wall 70 and the rear end wall 72, merge into a peripheral flange 76. The peripheral flange 58 of the inner housing 36 is attached to the peripheral flange 76 of the outer housing 38 by a folded edge 80 of the peripheral flange 58 of the inner housing 36. A plurality of bolt holes 84 are provided in the peripheral flanges 58 and 76 to enable bolting of the fluid pan assembly 12 to the underside of the transmission 10.

As seen in FIGS. 2, 3, and 4, the sidewalls 48 and 66, the sidewalls 50 and 68, and front end walls 52 and 70 are spaced away from one another to define therebetween an outer chamber 86 for receiving exhaust gas from the vehicle engine. In particular, as seen in FIG. 2, an inlet opening 88 is provided in the sidewall 66 of the outer housing 38. On the opposite side of the fluid pan assembly 12, an outlet opening 90 is provided in the sidewall 68 of the outer housing 38. As best seen in FIG. 2, an exhaust pipe inlet fitting 94 is welded to the sidewall 66 of outer housing 38 and registers with the inlet opening 88. The exhaust pipe inlet fitting 94 has bolt holes 96 therein for bolting to the exhaust pipe 18. An exhaust pipe outlet fitting 98 is welded to the sidewall 68 of the outer housing 38 and registers with the outlet opening 90. The outlet fitting 98 has bolt holes 102 for bolting to the right bank exhaust pipe 20.

Referring again to FIGS. 2, 3, and 4, a plurality of heat transfer fins 106 are provided for enhancing the transfer of heat from exhaust gas contained within the outer chamber 86 to the transmission fluid 42 stored within the inner chamber 40. As best seen in FIG. 2, the fins are provided by a plurality of U-shaped channels 110. Each U-shaped channel 110 includes a base wall 112 welded to a sidewall or end wall of the inner housing 36, and a pair of laterally spaced fin walls 114 and 116 that project from the base wall 112 into the outer chamber 86. One or more of these U-shaped channels 110 is provided on the sidewalls 48 and 50 of the inner housing 36, and on the front end wall 52 of the inner housing 36.

Figure 5:
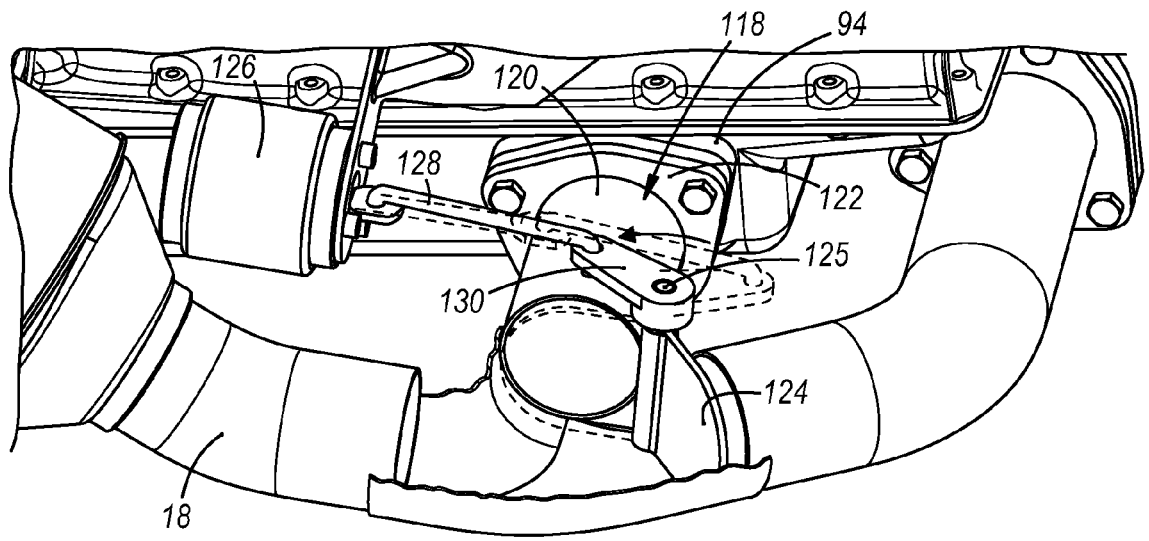
FIG. 5 is an enlarged view having parts broken away and in section showing an inlet valve for opening and shutting exhaust gas flow to the fluid pan assembly.

Referring to FIG. 5, an inlet valve 118 communicates hot exhaust gas into the outer chamber 86. In particular, the left bank exhaust pipe 18 has a branch pipe 120 that is fitted with a flange 122 that bolts to the inlet fitting 94 of the outer housing 36. A flapper valve 124 pivots at pivot 125 for rotary motion between a solid line position of FIG. 5 and a phantom line position of FIG. 5. A motor 126 is connected to the flapper valve 124 by a rod 128 and arm 130 so that the motor 126 can pivot the flapper valve 124 between the solid line position and the phantom line position.

In the solid line position, the flapper valve 124 has opened the flow of exhaust gas into the branch pipe 120 and outer chamber 86, while at the same time closing all or part of the flow of exhaust gas to the tailpipe 26. Accordingly, the hot exhaust gas is being ducted into the outer chamber 86 where the exhaust gas will be exposed to the fins 106, the sidewalls 48 and 50, and front end wall 52 of the inner housing 36. Heat transfers into the transmission fluid 42. After flowing through the outer chamber 86, the exhaust gas will be exhausted through the outlet opening 90 into an outlet branch pipe 136 that connects back into the right bank exhaust pipe 20 and thence through the exhaust pipe juncture 22 to the tailpipe 26, as seen in FIG. 1.

In the phantom line position of FIG. 5, the flapper valve 124 is closing the flow of exhaust gas to the inlet opening 88 so that the exhaust gas will not reach the outer chamber 86 and the heating of the transmission fluid 42 by the exhaust gas is terminated. The motor 126 for operating the flapper valve 124 can be hydraulic, pneumatic, or electrical, and is operated through a control system in response to the temperature of the transmission fluid 42.

Although the drawings herein show the example of a fluid pan assembly 12 that is constructed by two metal stampings that are joined together, it will be understood that the fluid pan assembly can be manufactured in a casting process in which case the housings can be a one-piece casting or a separate inner casting and outer casting. In the case of a cast housing, the fins can be cast integrally with the inner housing rather than being separately manufactured and welded thereto.

Referring again to FIGS. 2 and 3, the bottom walls 46 and 64 are shown as touching one another with no space therebetween. This construction is advantageous as it maintains the maximum clearance from the ground. However, space can be provided between the bottom walls 46 and 64 if it is desired to provide for the circulation of exhaust gas through that space. In addition, as best seen in FIGS. 2, 3, and 4, the rear end walls 54 and 72 are touching one another with no space therebetween. This construction is advantageous as it causes the exhaust gas to achieve a U-shaped flow through the outer chamber 86. In particular, the exhaust gas will enter the fluid pan 12 on one side at the inlet opening 88 and then travel around the one side down along the front and then along the other side before exiting through the outlet opening 90. However, if desired, a space can be provided between the rear end walls 54 and 72 so that the rear end wall 54 can also be exposed to the exhaust gas.

Although the drawings herein show the invention applied to an engine having a left bank exhaust and right bank exhaust, the invention can also be applied to an engine having an exhaust pipe extending from a single side of the engine.

Thus, a compact and economically manufactured transmission fluid heater is provided for enhancing the operation of the vehicle by heating the transmission fluid to minimize transmission spin loss and improve the fuel economy of the vehicle.

What is claimed is:

1. A compact transmission fluid heater for a motor vehicle comprising: a fluid pan assembly mounted on the a transmission for storing a supply of transmission fluid, said fluid pan assembly having an inner chamber storing the transmission fluid and an outer chamber surrounding the inner chamber, said fluid pan assembly including an inner housing having a bottom wall, first and second sidewalls, a front endwall and a rear endwall, and an outer housing having a bottom wall, first and second sidewalls, a front endwall and a rear endwall, the front endwalls and the first and second sidewalls of the inner and outer housings being spaced respectively from one another to thereby define the outer chamber therebetween, the rear endwalls of the inner and outer housing engaging one another with no space therebetween to further define the shape of the outer chamber as U-shaped, and the bottom walls of the inner and outer housings engaging with one another with no space therebetween to further define the outer chamber and maximize clearance from a ground surface beneath the motor vehicle, the inner and outer housings each having peripheral flanges engaging with and connecting to one another to define the top of the outer chamber and provide for bolting of the fluid pan assembly to the transmission, an inlet to the outer chamber communicating with a source of engine exhaust gas, an outlet from the outer chamber for exhausting the exhaust gas, and an inlet valve for either opening or shutting the communication of engine exhaust gas to the inlet.

2. The compact transmission fluid heater of claim 1 further comprising a plurality of heat exchanger fins enhancing a transfer of heat from the engine exhaust gas within the outer chamber to the transmission fluid stored within the inner chamber.

3. The compact transmission fluid heater of claim 1 further comprising the inlet to the outer chamber communicating with an exhaust pipe extending from a first side of an engine and the outlet from the outer chamber communicating with an exhaust pipe extending from a second side of the engine.

4. The compact transmission fluid heater of claim 1 further comprising the inlet and outlet being provided in the outer metal housing.

5. The compact transmission fluid heater of claim 1 further comprising a plurality of fins attached to one of the inner and outer metal housings and projecting toward the other metal housing to enhance the transfer of heat.

6. The compact transmission fluid heater of claim 1 further comprising a plurality of fins projecting from the inner metal housing into the outer chamber to enhance the transfer of heat.

7. The compact transmission fluid heater of claim 1 further comprising the inner metal housing and the outer metal housing being of stamped sheet-metal manufacture.

8. The compact transmission fluid heater of claim 7 further comprising a plurality of U-shaped fins of stamped sheet-metal manufacture, each of the U-shaped fins having a base welded to the inner metal housing and first and second fin legs projecting into the outer chamber to enhance the transfer of heat from the exhaust gas into the transmission fluid.

9. The compact transmission fluid heater of claim 1 further comprising the valve having a valve element operated by a motor for either opening the inlet or shutting the inlet.

10. A compact transmission fluid heater for a motor vehicle comprising: a fluid pan assembly including an inner housing storing transmission fluid and an outer housing attached to the inner housing but having wall portions spaced from the inner housing to define therebetween an engine exhaust chamber, said outer housing having wall portions including an inlet receiving the flow of exhaust gas from an engine and an outlet for exhausting the flow of exhaust gas from the engine exhaust chamber, and a plurality of fins projecting from the inner housing into the exhaust gas chamber to enhance the transfer of heat from the exhaust gas to the transmission fluid, wherein said, said fluid pan assembly including an inner housing having a bottom wall, first and second sidewalls, a front endwall and a rear endwall, and an outer housing having a bottom wall, first and second sidewalls, a front endwall and a rear endwall, the front endwalls and the first and second sidewalls of the inner and outer housings being spaced from one another to thereby define the engine exhaust chamber therebetween, the rear endwalls of the inner and outer housings engaging one another with no space therebetween to further define the shape of the engine exhaust chamber as U-shaped, and the bottom walls of the inner and outer housings engaging with one another with no space therebetween to further define the engine exhaust chamber and maximize clearance from a ground surface beneath the motor vehicle, the inner and outer housings each having peripheral flanges engaging and attached to one another to define a top of the engine exhaust chamber and provide for bolting of the fluid pan assembly to the transmission.

11. The compact transmission fluid heater of claim 10 comprising a valve attached to the inlet for opening and shutting the flow of exhaust gas into the engine exhaust chamber.

12. The compact transmission fluid heater of claim 10 further comprising the inner and outer housings being of stamped metal construction and having peripheral edges of the inner and outer housings attached together forming a flange for bolting to a transmission.

13. The compact transmission fluid heater of claim 10 further comprising the inlet and the outlet including exhaust pipe fittings that are welded to the outer housing for bolting to exhaust pipes of the engine exhaust system.

14. The compact transmission fluid heater of claim 10 further comprising the fins projecting from the inner housing being of U-shaped metal construction with a base welded to the inner housing and spaced apart fins projecting into the exhaust gas chamber between the inner and outer housings.

15. The compact transmission fluid heater of claim 10 further comprising a valve provided at the inlet to the outer housing for opening and shutting the flow of exhaust gas into the exhaust gas chamber, the valve having a motor for operating the valve element between the opening and shutting positions thereof.

16. A compact transmission fluid heater for a motor vehicle comprising: a fluid pan assembly including an inner housing storing transmission fluid and an outer housing attached to the inner housing but having wall portions spaced from the inner housing to define therebetween an engine exhaust chamber, said outer housing having wall portions including an inlet receiving the flow of exhaust gas from an engine and an outlet for exhausting the flow of exhaust gas from the engine exhaust chamber, a plurality of fins projecting from the inner housing into the exhaust gas chamber to enhance the transfer of heat from the exhaust gas to the transmission fluid and a valve attached to the inlet of the outer housing and having a valve element opening and shutting the flow of exhaust gas into the engine exhaust chamber, the valve having a motor for operating the valve element between the opening and shutting positions thereof, and wherein the fluid pan assembly includes an inner housing having a bottom wall, first and second sidewalls, a front endwall and a rear endwall, and an outer housing having a bottom wall, first and second sidewalls, a front endwall and a rear endwall, the front endwalls and the first and second sidewalls of the inner and outer housings being spaced from one another to thereby define the engine exhaust chamber therebetween, the rear endwalls of the inner and outer housings engaging one another with no space therebetween to further define the shape of the engine exhaust chamber as U-shaped, and the bottom walls of the inner and outer housings engaging with one another with no space therebetween to further define the engine exhaust chamber and maximize clearance from a ground surface beneath the motor vehicle, the inner and outer housings each having peripheral flanges engaging one another to define the top of the engine exhaust chamber and provide for bolting of the pan assembly to the transmission, the fins projecting from the inner housing and being of U-shaped metal construction with a base welded to the inner housing and spaced apart fins projecting into the engine exhaust chamber between the inner and outer housings.

17. The compact transmission fluid heater of claim 16 further comprising the inner and outer housings being of stamped metal construction.

18. The compact transmission fluid heater of claim 16 further comprising the inlet and the outlet including exhaust pipe fittings that are welded to the outer housing for bolting to exhaust pipes of the engine exhaust system.

* * * * *